(12) United States Patent
Kwon et al.

(10) Patent No.: US 9,635,394 B2
(45) Date of Patent: Apr. 25, 2017

(54) METHOD AND DEVICE FOR FLEXIBLE MMT ASSET TRANSMISSION AND RECEPTION

(71) Applicant: ELECTRONICS AND TELECOMMUNICATIONS RESEARCH INSTITUTE, Daejeon (KR)

(72) Inventors: Sun Hyoung Kwon, Daejeon (KR); Seong Jun Bae, Daejeon (KR); Jin Young Lee, Seoul (KR); Kug Jin Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/439,450

(22) PCT Filed: Jan. 24, 2014

(86) PCT No.: PCT/KR2014/000713
§ 371 (c)(1),
(2) Date: Apr. 29, 2015

(87) PCT Pub. No.: WO2014/116060
PCT Pub. Date: Jul. 31, 2014

(65) Prior Publication Data
US 2015/0296231 A1    Oct. 15, 2015

(30) Foreign Application Priority Data

Jan. 24, 2013  (KR) .................. 10-2013-0007761
Jan. 25, 2013  (KR) .................. 10-2013-0008940
Jan. 24, 2014  (KR) .................. 10-2014-0008880

(51) Int. Cl.
*H04N 21/63*     (2011.01)
*H04N 21/4385*   (2011.01)
(Continued)

(52) U.S. Cl.
CPC ... *H04N 21/23605* (2013.01); *H04N 21/2362* (2013.01); *H04N 21/23614* (2013.01);
(Continued)

(58) Field of Classification Search
CPC ......... H04N 21/23605; H04N 21/2632; H04N 21/631; H04N 19/463; H04N 21/2362;
(Continued)

(56) References Cited

U.S. PATENT DOCUMENTS 7,752,214 B2 *   7/2010  Pizzorni .................... G06F 8/60
                                                    707/756
2012/0324521 A1 * 12/2012  Rhyu ...................... H04N 21/84
                                                    725/109
(Continued)

FOREIGN PATENT DOCUMENTS

KR    1020080092420 A    10/2008
KR    1020090084875 A     8/2009
(Continued)

OTHER PUBLICATIONS

Kyungmo Park, Youngkown Lim, Schuichi Aoki, Jin Young Lee; "Study of ISO/IEC CD 23008-1 MPEG Media Transport", Oct. 2012.*
(Continued)

*Primary Examiner* — Benjamin R Bruckart
*Assistant Examiner* — Tien M Nguyen
(74) *Attorney, Agent, or Firm* — Ladas & Parry LLP

(57) ABSTRACT

A method for transmitting an MMT packet in an MMT (MPEG Media Transport) system includes: generating an MMT asset by performing encapsulation based on a Media Processing Unit (MPU) generated based on a media Access
(Continued)

Unit (AU); generating MMT Composition Information on the MMT asset; generating an MMT packet by packetizing the MMT asset and the MMT-CI; and transmitting the generated MMT packet to a receiving side, wherein the MMT-CI may contain dependency information of the MMT asset on at least one other MMT asset. Accordingly, it is possible to indicate whether an MMT packet depends on other MMT assets when transmitting and receiving multi-layered media data, and to support proper decoding of the MMT asset when providing hybrid delivery-based MMT service.

12 Claims, 16 Drawing Sheets

(51) Int. Cl.
  *H04N 21/2362* (2011.01)
  *H04N 21/236* (2011.01)
  *H04N 21/434* (2011.01)
(52) U.S. Cl.
  CPC ..... *H04N 21/4343* (2013.01); *H04N 21/4348* (2013.01); *H04N 21/4385* (2013.01); *H04N 21/631* (2013.01)
(58) Field of Classification Search
  CPC ........... H04N 21/4348; H04N 21/4343; H04N 21/23614; H04N 21/4385
  See application file for complete search history.

(56) References Cited

U.S. PATENT DOCUMENTS

| | | | |
|---|---|---|---|
| 2013/0016282 A1 | 1/2013 | Kim et al. | |
| 2014/0334504 A1* | 11/2014 | Yie | H04H 20/18 370/474 |
| 2015/0020131 A1* | 1/2015 | Choi | H04N 21/234327 725/109 |

FOREIGN PATENT DOCUMENTS

| | | |
|---|---|---|
| KR | 1020120084217 A | 7/2012 |
| KR | 1020120138319 A | 12/2012 |
| KR | 1020120138607 A | 12/2012 |
| KR | 1020120138693 A | 12/2012 |
| KR | 1020130009670 A | 1/2013 |

OTHER PUBLICATIONS

Kyungmo Park, et al; "Study of ISO/IEC CD 23008-1 MPEG Media Transport", MPEG-H Systems, ISO/IEC JTC1/SC29/WG11 MPEG/N13089; Shanghai, China, Oct. 2012, 125 pages.
International Search Report dated May 8, 2014; PCT/KR2014/000713.

* cited by examiner

FIG. 6

```
<!DOCTYPE html>
<html xmlns="http://www.w3.org/1999/xhtml">
  <head>
    <title>Entertainment</title>
    <MMT-CI:view id="View1" style="position:absolute; width:1920px; height:1080px" MMT-CI:begin="0s" MMT-CI:end="indefinite">
      <MMT-CI:divLocation id="div1" style="position:absolute; left:0px; top:0px; width:1920px; height:1080px" MMT-CI:begin="0s" MMT-CI:end="indefinite" MMT-CI:refDiv="Area1"/>
    </MMT-CI:view>
  </head>
  <body>
    <div id="Area1" style="position:absolute; width:1920px; height:1080px">
      <video id="Video1" src="mmt://asset3.mp4" style="position:absolute; left:0px; top:0px; width:1920px; height:1080px" MMT-CI:begin="0s"/>
        <source src="mmt://asset3.mp4" MMT-CI:begin="0s"/>
        <source src="mmt://asset2.mp4" isDependent="TRUE" depID="mmt://asset2.mp4 mmt://asset1.mp4"/>
        <source src="mmt://asset1.mp4" isDependent="TRUE" depID="mmt://asset1.mp4"/>
        <source src="mmt://asset1.mp4" isDependent="FALSE">
    </div>
  </body>
</html>
```

FIG. 7

```
<!DOCTYPE html>
<html xmlns="http://www.w3.org/1999/xhtml" >
  <head>
    <title>Entertainment</title>
    <MMT-CI:view id="View1" style="position:absolute; width:1920px; height:1080px" MMT-CI:begin="0s" MMT-CI:end="indefinite" >
      <MMT-CI:divLocation id="divL1" style="position:absolute; left:0px; top:0px; width:1920px; height:1080px" MMT-CI:begin="0s" MMT-CI:end="indefinite" MMT-CI:refDiv="Area1"/>
    </MMT-CI:view>
  </head>
  <body>
    <div id="Area1" style="position:absolute; width:1920px; height:1080px" >
      <video id="Video1" src="mmt://asset3.mp4" style="position:absolute; left:0px; top:0px; width:1920px; height:1080px" MMT-CI:begin="0s"/>
        <source src="mmt://asset3.mp4" isDependent="TRUE" depID="mmt://asset2.mp4"/>
        <source src="mmt://asset2.mp4" isDependent="TRUE" depID="mmt://asset1.mp4"/>
        <source src="mmt://asset1.mp4" isDependent="FALSE">
    </div>
  </body>
</html>
```

FIG. 8

- HTML5

```
<!DOCTYPE html>
<html xmlns="http://www.w3.org/1999/xhtml">
<head>
    <title>Entertainment</title>
</head>
<body>
    <div id="Area1" style="position:absolute; width:1920px; height:1080px">
        <video id="Video1" src="mmt://asset3.mp4" style="position:absolute; left:0px; top:0px; width:1920px; height:1080px" mmtci:begin="0s"/>
    </div>
</body>
</html>
```

- CI

```
<mmtci:CI>
    <mmtci:view id="View1" style="position:absolute; width:1920px; height:1080px" mmtci:begin="0s" mmtci:end="indefinite">
        <mmtci:divLocation id="divL1" style="position:absolute; left:0px; top:0px; width:1920px; height:1080px" mmtci:begin="0s" mmtci:end="indefinite" mmtci:refDiv="Area1"/>
    </mmtci:view>
    <mmtci:MediaSync id="MediaSync1" mmtci:isDependent="TRUE" mmtci:depId="mmt://asset2.mp4" mmtci:refId="mmt://asset3.mp4"/>
    <mmtci:MediaSync id="MediaSync2" mmtci:isDependent="TRUE" mmtci:depId="mmt://asset1.mp4" mmtci:refId="mmt://asset2.mp4"/>
</mmtci:CI>
```

FIG. 9

- HTML5

```
<!DOCTYPE html>
<html xmlns="http://www.w3.org/1999/xhtml">
<head>
    <title>Entertainment</title>
</head>
<body>
    <div id="Area1" style="position:absolute; width:1920px; height:1080px">
        <video id="Video1" src="mmt://asset3.mp4" style="position:absolute; left:0px; top:0px; width:1920px; height:1080px" mmtci:begin="0s"/>
    </div>
</body>
</html>
```

- CI

```
<mmtci:CI>
    <mmtci:view id="View1" style="position:absolute; width:1920px; height:1080px" mmtci:begin="0s" mmtci:end="indefinite">
        <mmtci:divLocation id="divL1" style="position:absolute; left:0px; top:0px; width:1920px; height:1080px" mmtci:begin="0s" mmtci:end="indefinite" mmtci:refDiv="Area1"/>
    </mmtci:view>
    <mmtci:MediaSync id=" MediaSync1" mmtci:isDependent="TRUE" mmtci:depId="mmt://asset2.mp4" mmtci:refId="mmt://asset3.mp4" />
    <mmtci:MediaSync id=" MediaSync2" mmtci:isDependent="TRUE" mmtci:depId="mmt://asset1.mp4" mmtci:refId="mmt://asset2.mp4" />
</mmtci:CI>
```

FIG. 10

```
<!DOCTYPE html>
<html xmlns="http://www.w3.org/1999/xhtml">
    <head>
        <title>Entertainment</title>
        <MMT-CI:view id="View1" style="position:absolute; width:1920px; height:1080px" MMT-CI:begin="0s" MMT-CI:end="indefinite">
            <MMT-CI:divLocation id="divL1" style="position:absolute; left:0px; top:0px; width:1920px; height:1080px" MMT-CI:begin="0s" MMT-CI:end="0s" MMT-CI:refDiv="Area1"/>
        </MMT-CI:view>
    </head>
    <body>
        <div id="Area1" style="position:absolute; width:1920px; height:1080px" >
            <video id="Video1" src="mmt://asset3.mp4" style="position:absolute; left:0px; top:0px; width:1920px; height:1080px" MMT-CI:begin="0s"/>
                <source src="mmt://asset2.mp4" depID="mmt://asset1.mp4"/>
                <source src="mmt://asset1.mp4"/>
        </div>
    </body>
</html>
```

FIG. 11

```
<!DOCTYPE html>
<html xmlns="http://www.w3.org/1999/xhtml" >
    <head>
        <title>Entertainment</title>
        <MMT-CI:view id="View1" style="position:absolute; width:1920px; height:1080px" MMT-CI:begin="0s" MMT-CI:end="indefinite" >
            <MMT-CI:divLocation id="div1.1" style="position:absolute; left:0px; top:0px; width:1920px; height:1080px" MMT-CI:begin="0s" MMT-CI:end="indefinite" MMT-CI:refDiv="Area1"/>
        </MMT-CI:view>
    </head>
    <body>
        <div id="Area1" style="position:absolute; width:1920px; height:1080px" >
            <video id="Video1" src="mmt://asset3.mp4" style="position:absolute; left:0px; top:0px; width:1920px; height:1080px" MMT-CI:begin="0s"/>
                <source src="mmt://asset2.mp4" depID="mmt://asset1.mp4"/>
                <source src="mmt://asset1.mp4" depID="mmt://asset1.mp4"/>
        </div>
    </body>
</html>
```

FIG. 12

```
<!-- mmtci:MediaSync Type -->
<xsd:complexType name="MediaSyncType">
    <xsd:sequence>
        <xsd:element name="sourceList" type="sourceListType" minOccurs="0" maxOccurs="unbounded"/>
    </xsd:sequence>
    <xsd:attribute name="begin" type="beginType" default="0s"/>
    <xsd:attribute name="end" type="endType" default="indefinite"/>
    <xsd:attribute name="dur" type="durType"/>
    <xsd:attribute name="clipBegin" type="clipBeginType" default="0s"/>
    <xsd:attribute name="clipEnd" type="clipEndType" default="indefinite"/>
    <xsd:attribute name="refId" type="refIdType"/>
    <xsd:attribute name="mediaSrc" type="mediaSrcType"/>
    <xsd:attribute name="type" type="xsd:token" fixed="simple"/>
    <xsd:attribute name="href" type="xlink:hrefType"/>
    <xsd:attribute name="show" type="xsd:token" fixed="embed"/>
    <xsd:attribute name="actuate" type="xlink:actuateType"/>
    <xsd:attribute name="isDependent" type="xsd:boolean" use="optional" default="FALSE"/>
    <xsd:attribute name="depId" type="StringVectorType" use="optional"/>
</xsd:complexType>
<!-- mmtci:sourceList Type -->
<xsd:complexType name="sourceListType">
    <xsd:attribute name="mediaSrc" type="mediaSrcType"/>
</xsd:complexType>
```

METHOD AND DEVICE FOR FLEXIBLE MMT ASSET TRANSMISSION AND RECEPTION

BACKGROUND OF THE INVENTION

1. Field of the Invention

The present invention relates to the flexible transmission of multilayer media data, and more particularly, to a method and apparatus of transmitting and receiving a flexible MMT asset in a hybrid delivery-based MMT (MPEG Media Transport) service.

2. Discussion of the Related Art

Since the standardization of MPEG-2, new standards for video encoding standard (or an audio encoding standard) have been steadily developed into MPEG-4, H.264/AVC, and Scalable Video Coding (SVC) in the last 10 years. Furthermore, each of the new standards has made a new market and widened the application scope of the MPEG standard. Transmission technology, such as MPEG-2 Transport System (TS), however, has been widely used in digital broadcasting and mobile broadcasting (T-DMB, DVB-H, etc.) in the market during the past 20 years without change. The transmission technology has been widely utilized even in multimedia transmission over the Internet, i.e. IPTV service, that had not been considered when the MPEG-2 TS standard was established.

However, a multimedia transmission environment when the MPEG-2 TS was developed and a current multimedia transmission environment have been significantly varied. For example, the MPEG-2 TS standard was developed by considering the transmission of multimedia data over an ATM network, but it has become difficult to find use cases where the MPEG-2 TS standard is used for this purpose. Furthermore, the MPEG-2 TS standard includes factors that are not efficient for recent multimedia transmission over the Internet because requirements, such as requirements for multimedia transmission via the Internet, were not taken into consideration when the MPEG-2 TS standard was developed. Accordingly, in MPEG, the establishment of an MPEG Multimedia Transport Layer (MMT), that is, a new multimedia transmission standard which is suitable for a varying multimedia environment and into which multimedia service through the Internet has been taken into consideration, is recognized as a very important problem.

As described above, an important reason why MMT standardization is in progress lies in that the MPEG2-TS standard completed 20 years ago has not been optimized for the recent IPTV broadcasting service, Internet environment, etc. For this reason, in MPEG, the MMT has been standardized as a new transmission technology standard according to an urgent need for a multimedia transmission international standard that is optimized in a multimedia transmission environment in a variety of recent heterogeneous networks. The conventional MPTEG 2 TS standard alone cannot provide sufficient support for a variety of application examples for hybrid delivery (or transmission) over a broadcast network and a broadband network.

Hybrid delivery-based MMT service enables the delivery of multiple media data to a client device from different servers via multiple paths (e.g., other channels or networks). In this case, the client device has to be able to service a plurality of received media streams while keeping them in synchronization in an integrated fashion.

However, according to the CMMT SoCD (Study of Committee Draft) which is currently in progress, every layer of multilayer media data must be included in a single MPU (Media Processing Unit). As an MMT asset is a collection of one or more MPUs, every layer belongs to a single MMT asset. In this case, every layer has a single ADC (Asset Delivery Characteristic). Accordingly, the current MMT SoCD cannot provide sufficient support for hybrid delivery by which individual layers of the multilayer are assigned different delivery characteristics and transmitted via multiple paths.

SUMMARY OF THE INVENTION

A technical task of the present invention is to support flexible MMT asset transmission.

Another task of the present invention is to provide the format of an MMT asset for supporting hybrid delivery.

Still another task of the present invention is to provide an MMT Composition Information (CI) for supporting hybrid delivery.

According to one aspect of the present invention, there is provided an apparatus for transmitting an MMT packet in an MMT (MPEG Media Transport) system. The MMT packet transmitting apparatus may include: an asset generator that generates an MMT asset by performing encapsulation based on a Media Processing Unit (MPU) generated based on a media Access Unit (AU); a composition information generator that generates MMT Composition Information on the MMT asset; a packetizer that generates an MMT packet by packetizing the MMT asset and the MMT-CI; and a transmitter that transmits the generated MMT packet to a receiving side, wherein the MMT-CI may contain dependency information of the MMT asset on at least one other MMT asset.

According to another aspect of the present invention, there is provided an apparatus for receiving an MMT packet in an MMT (MPEG Media Transport) system. The MMT packet receiving apparatus may include: a receiver that receives an MMT packet from an MMT packet transmitting apparatus; an MMT depacketizer that generates an MMT packet and MMT Composition Information (MMT-CI) on the MMT asset by depacketizing the received MMT packet; and a decoder that determines the dependency relationship between the MMT asset and at least one other MMT asset, based on dependency information contained in the MMT-CI, and decodes the MMT asset based on the dependency relationship.

According to still another aspect of the present invention, there is provided a method for receiving an MMT packet in an MMT (MPEG Media Transport) system. The MMT packet receiving method may include: receiving an MMT packet from a transmitting side; generating an MMT packet and MMT Composition Information (MMT-CI) on the MMT asset by depacketizing the received MMT packet; determining the dependency relationship between the MMT asset and at least one other MMT asset based on dependency information contained in the MMT-CI; and decoding the MMT asset based on the dependency relationship.

According to a further aspect of the present invention, there is provided a method for transmitting an MMT packet in an MMT (MPEG Media Transport) system. The MMT packet transmitting method may include: generating an MMT asset by performing encapsulation based on a Media Processing Unit (MPU) generated based on a media Access Unit (AU); generating MMT Composition Information on the MMT asset; generating an MMT packet by packetizing the MMT asset and the MMT-CI; and transmitting the generated MMT packet to a receiving side, wherein the MMT-CI may contain dependency information of the MMT asset on at least one other MMT asset.

According to the present invention, it is possible to indicate whether an MMT packet depends on other MMT assets when transmitting and receiving multi-layered media data, and to support proper decoding of the MMT asset when providing hybrid delivery-based MMT service.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6 to 9 show examples of MMT CI for multi-layered media data according to a first exemplary embodiment of the present invention;

FIGS. 10 and 11 show examples of MMT CI for multi-layered media data according to a second exemplary embodiment of the present invention;

FIG. 12 shows examples of the types of the isDependent and depID attributes according to the present invention;

DETAILED DESCRIPTION OF THE PREFERRED EMBODIMENTS

Figure 1:
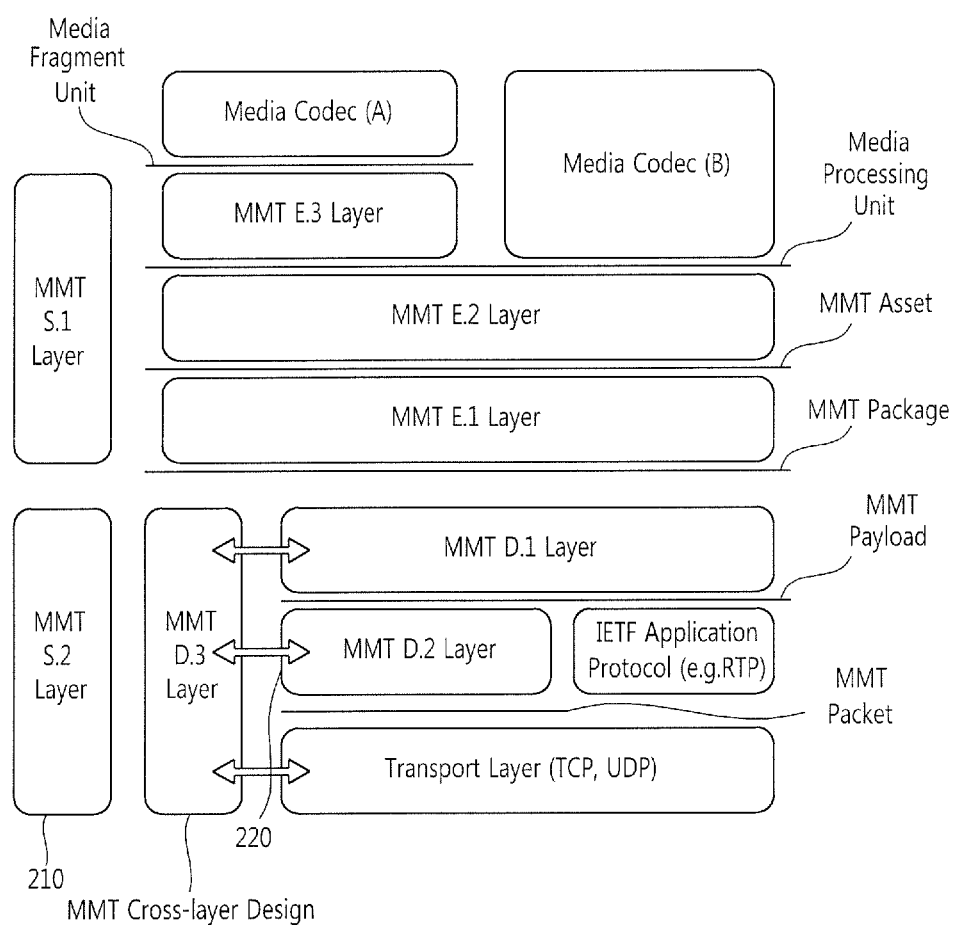
FIG. 1 is a conceptual diagram showing an MMT layer structure according to an exemplary embodiment of the present invention.

The present invention may be modified in various ways and may have several exemplary embodiments. Specific exemplary embodiments of the present invention are illustrated in the drawings and described in detail in the detailed description.

However, this does not limit the invention within specific embodiments and it should be understood that the invention covers all the modifications, equivalents, and replacements within the idea and technical scope of the invention.

Terms, such as the first, the second, A, and B, may be used to describe various elements, but the elements should not be restricted by the terms. The terms are used to only distinguish one element from the other element. For example, a first element may be named a second element without departing from the scope of the present invention. Likewise, a second element may be named a first element. A term 'and/or' includes a combination of a plurality of relevant and described items or any one of a plurality of related and described items.

When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Exemplary embodiments of the present invention will be described in detail below with reference to the accompanying drawings. In order to facilitate the general understanding of the present invention in describing the present invention, through the accompanying drawings, the same reference numerals will be used to describe the same components and an overlapped description of the same components will be omitted.

Hereinafter, the meanings of terms such as a content component, content, hybrid delivery, presentation, service, and service information are defined as follows.

A content component or a media component is defined as media of a single type or a subset of the media of a single type, and it may become, for example, a video track, movie subtitles, or an enhancement layer of video.

Content is defined as a set of content components, and it may become, for example, a movie or a song.

Hybrid delivery is defined as the simultaneous deliver of one or more content components over one or more networks which are physically different.

Presentation is defined as an operation that is performed by one or more devices so that a user can experience (e.g., watching movies) one content component or one service.

Service is defined as one or more content components that are transmitted for presentation or storage.

Service information is defined as meta data that describes one service and the characteristics and components of the service.

Non-timed data defines all data elements which can be consumed without specifying the time. The non-timed data is a type of data that has no unique synchronization information for decoding and/or presentation of its media unit.

Timed data is a type of data that has unique synchronization information for decoding and/or presentation of its media unit. The timed data defines a data element that is related to a specific decoded and presented time.

An Access Unit (AU) is the smallest data entity.

A Media Fragment Unit (MFU) is a general container that is independent for any specific codec, and accommodates coded media data which can be independently consumed by a media decoder. The AU contains independently decodable media data such as a complete or partial AU for timed media data by a media decoder or a file for non-timed media data. The MFU has a size smaller than or larger than the Access Unit (AU) and accommodates information that may be used in a transport layer.

A Media Processing Unit (MPU) is a general container that is independent for any specific media codec, and also a general container for timed or non-timed data which can be independently decoded. It accommodates at least one AU and part of non-timed data, together with information related to additional transmission and consumption. MPU processing means encapsulation into a package or packetization for transmission. An MPU is coded media data that is full and can be independently processed. However, for Scalable Video Coding (SVC) and Multiview Video Coding (MVC), the MPU may not be independently and completely consumed by a media codec server.

An MMT asset is a logical data entity that is formed into at least one MMT Processing Unit (MPU) along with the same MMT asset ID or formed of a lump of specific data along with a format defined in another standard. The MMT asset is a data entity containing data with the same transport characteristics.

MMT Asset Delivery Characteristics (MMT-ADC) is a description about the Quality of Service (QoS) requirements for delivery of MMT Assets. The MMT-AD is represented by parameters agnostic to delivery environments.

MMT Composition Information (MMT CI) describes a spatial and temporal relationship between MMT assets.

An MMT entity is a software or hardware implementation compliant to an MMT profile.

An MMT packet is a formatted unit of data that is generated or consumed according to the MMT profile.

An MMT package is a set of logically structured data, and it includes at least one MMT asset, MMT-composition information, and MMT-asset delivery characteristics and explanatory information.

An MMT payload is a formatted unit of data that carries a package or signals a message by an MMT protocol or an Internet application layer protocol (e.g., RTP (Real-Time Transport Protocol).

An MMT protocol is an application layer transport protocol for delivering an MMT payload over an IP network.

An MMT payload format is a format for the payload of an MMT package or MMT signaling message that will be transmitted by an MMT protocol or an Internet application layer protocol (e.g., RTP).

Hereinafter, a first network or a second network includes a variety of networks including a broadcast network, a broadband network, a cable network, or a satellite communication network.

Hereinafter, hybrid delivery can be done in MMT assets, substreams, MMT packages, or MMT packets, or if video content is composed of a plurality of layers including a first layer, a second layer, etc, hybrid delivery can be done in layers.

FIG. 1 is a conceptual diagram showing an MMT layer structure according to an exemplary embodiment of the present invention.

A MMT (Mpeg Media Transport) layer operates over a transport layer, and referring to FIG. 1, the MMT layer structure includes functional areas of an Encapsulation layer, a Delivery layer, and a Signaling layer.

The Encapsulation layer (E-layer) may include an MMT E.1 layer, an MMT E.2 layer, and an MMT E.3 layer, as shown in FIG. 1.

The E-layer defines a format for encapsulating coded media components to store them in a storage device or deliver them as a payload. The E-layer may be in charge of, for example, functions such as packetization, fragmentation, synchronization, and multiplexing of transmitted media.

Various types of multimedia components may be encapsulated and combined with one another so as to be transmitted and consumed by the functions provided by the E-layer. The encapsulated media components and configurations information of the media components are provided in the functional area of the E-layer.

Primary information about the encapsulated media components may include aggregation, prioritization, dependence of media fragments, timing information and structure information of an MPU, identification information of MMT assets 150, initialization information, and codec information. The configurations information of the media components may include identification information of an MMT package 160 and the MMT assets 150, configurations information containing a list of the MMT assets 150, composition information (CI) 162 of the MMT assets 150 within the MMT package 160, and Asset Delivery Characteristics (ADC) 164.

The E-layer defines the logical structures of the formats of media content, an MMT package, and data units to be processed by an MMT entity, and defines an example of implementation of ISO base media file format (ISOBMFF). In order to provide information essential for adaptive transmission, an MMT package specifies components, including media content, and a relationship between the components. The formats of the data units are defined to encapsulate coded media for storage and delivery and allow easy conversion between them.

The E.3 layer generates a Media Processing Unit (MPU) by encapsulating a Media Fragment Unit (MFU) provided by a media codec (A) layer.

Coded media data from a higher layer is encapsulated into an MFU. The type and value of coded media may be abstracted so that an MFU can be commonly used in a specific codec technique. In this case, the MFU can be processed without accessing coded media whose lower layer has been encapsulated. A lower layer fetches requested coded media data from a network or the buffer of a depository and sends the coded media data to a media decoder. An MFU has a sufficient information media part unit for performing the above operation.

An MFU may become, for example, a picture or slice of video. The MFU may have a format that is independent from a specific codec and on which a data unit that can be independently consumed in a media decoder may be loaded. A plurality of MFUs which form one or more groups and which can be transmitted and decoded independently generate an MPU. Non-timed media which can be transmitted and decoded independently generates an MPU. The MPU describes the same internal structure as the arrangement and pattern of an MFU that enables rapid access to an MFU and the partial consumption of the MFU.

The E.2 layer generates an MMT asset by encapsulating the MPU generated in the E.3 layer.

An MMT asset is a data entity including one MPU or a plurality of MPUs from a single data source, and is a data unit in which Composition Information (CI) and Asset Delivery Characteristics (TCs) are defined. A sequence of MPUs from the same source component generates an MMT asset. The MMT asset is packaged in an MMT package, configured along with other MMT assets by Composition Information (CI) and Transport Characteristics (TC), multiplexed along with other MMT assets by the MMT payload format, and transmitted by the MMT protocol.

The MMT asset may correspond to Packetized Elementary Streams (PESs), and may correspond to, for example, video, audio, program information, an MPEG-U widget, a JPEG image, an MPEG 4 file format, and an MPEG transport stream (M2TS).

The E.1 layer generates an MMT package by encapsulating the MMT asset generated in the E.2 layer.

The MMT asset is packaged with Asset Delivery Characteristics (ADC) for selecting a proper transmission method for each MMT asset so that the effective quality of the MMT asset is satisfied. The MMT asset is also packaged with MMT-Composition Information (MMT-CI) for the purpose of a subsequent response of the same user experience, along with other functional areas (i.e., a transport area and a signal area) or separately from the functional areas.

Figure 3:
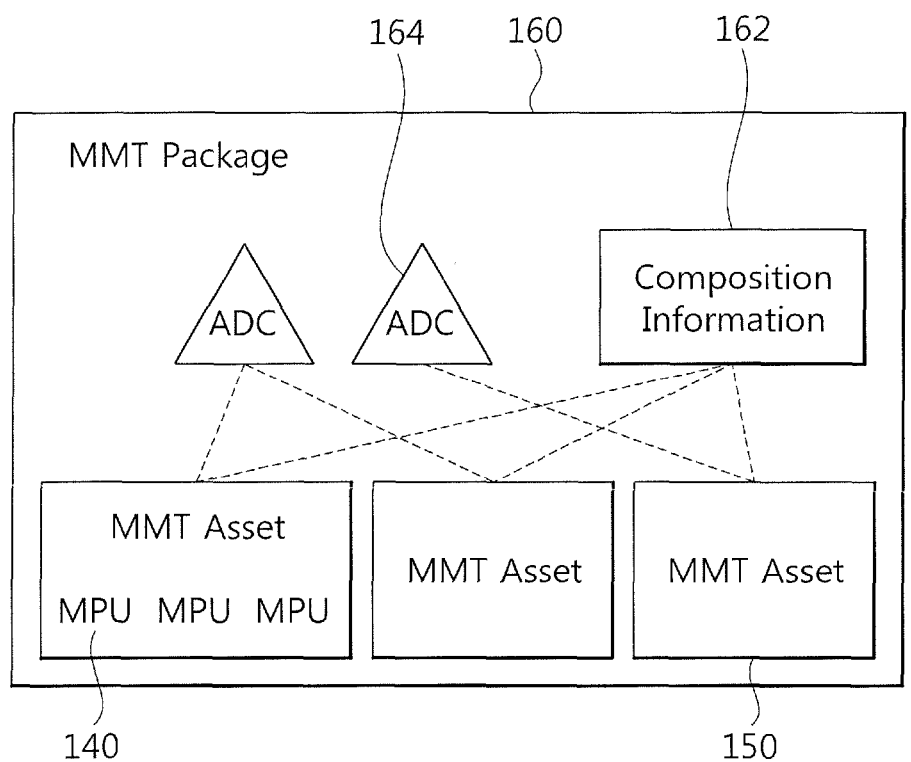
FIG. 3 shows the configuration of an MMT package according to an exemplary embodiment of the present invention.

FIG. 3 shows the configuration of an MMT package according to an embodiment of the present invention.

Referring to FIG. 3, the MMT package 160 includes one piece of Composition Information (CI) 162, at least one MMT asset 150, and Asset Delivery characteristics (ADC) 164 related to each asset. The MMT package may correspond to an MPEG-2TS program.

A package is processed on an MPU basis, and an asset is a set of at least one MPU with the same asset ID. Accordingly, it can be presumed that one package includes one piece of Composition Information (CI), at least one MMT asset, and Asset Delivery characteristics (ADC) related to each asset.

An asset may be an element of a package for encapsulating coded media data, such as audio, video, or webpage data, having the timed or non-timed feature.

The composition information includes information on a relationship between the MMT assets and may further include information on a relationship between a plurality of MMT packages if a piece of content includes the plurality of MMT packages.

The Asset Delivery characteristics (ADC) 164 represent the QoS requirements and statistics for asset delivery. A plurality of assets may be related to one ADC. The ADC may be used to set the parameters of an MMT payload and an MMT protocol by an entity that packetizes a package for effective delivery of the assets. The Asset Delivery characteristics 162 may include delivery characteristics information required to determine a delivery condition on the MMT asset or the MMT packet, and may include, for example, a traffic description parameter and a QoS descriptor.

The Delivery layer (D-layer) defines a payload format and an application layer transport protocol. The payload format is defined to transfer coded media data irrespective of the type of media or an encoding method. The application layer transport protocol provides an enhanced characteristic for the transfer of an MMT package including multiplexing and cross-layer communication.

The Delivery layer (D-layer) is in charge of functions such as multiplexing of media such as video and audio transmitted over a network between the Transport layer and the E-layer, aggregation and/or fragmentation of packet levels, network packetization, QoS control, synchronization, and interfacing with a Transport layer such as the existing RTP, a Transport layer such as the existing UDP or TCP, the E-layer, and the S layer.

The Delivery layer may perform network flow multiplexing, network packetization, QoS control, and the like, of media transported through, for example, a network.

The D-layer identifies different types of payloads coming from the E-layer in order to handle payloads from the E-layer.

The D-layer may describe a temporal relation between packets delivered over different networks and via different channels. The synchronization function may include hybrid network synchronization using a timestamp or the like.

The D-layer may describe timing constraints on MMT delivery packets for real-time media transport.

The D-layer may perform error correction on MMT media packets, such as Forward Error Correction and retransmission.

The D-layer may perform flow control on MMT media packets.

The D-layer may perform interaction with other MMT layers, as well as lower layers (MAC and PHY), through cross-layer design in order to maintain a predetermined level of QoS for the delivery of MMT media packets. Also, the D-layer may provide a function for performing group communication.

The Delivery layer (D-layer) may include an MMT D.1 layer, an MMT D.2 layer, and an MMT D.3 layer, as shown in FIG. 1.

The D.1 layer receives the MMT package generated from the E.1 layer and generates an MMT payload. The MMT payload consists of an MMT payload format. The MMT payload format is a payload format for transmitting an MMT asset and for transmitting information on the consumption of an MMT application protocol or the existing application transport protocol, such as an RTP. The MMT payload may include the fragments of an MFU along with information, such as an AL-FEC.

The MMT payload format is defined as a generic payload format for packetizing the content components of the package. The MMT payload format is defined irrespective of a specific media codec, so that any type of encapsulated media such as MPU may be packetized into a payload for an application layer protocol that supports streaming delivery of media content. The MMT payload may be used as a payload format for RTP, MMT, and other packet transmission protocols. Additionally, the MMT payload may also be used to packetize an MMT signaling message.

The D.2 layer 220 receives the MMT payload format generated in the D.1 layer and generates an MMT packet. An MMT packet is a data format that is used in the application transport protocol for MMT.

The D.3 layer supports QoS by providing a function of exchanging information between layers through cross-layer design. For example, the D.3 layer can perform QoS control using the QoS parameters of the Media Access Control/Physical (MAC/PHY) layers. The QoS parameters of MAC/PHY may include, for example, bitrate, packet loss ratio, expected delay, available buffer size, etc.

The S layer may include an MMT S.1 layer and an MMT S.2 layer, as shown in FIG. 1.

The S layer performs a signaling function. For example, the S layer may perform signaling functions, such as the session initialization/control/management, trick mode based on a server and/or a client, service discovery, synchronization, and interfacing with other layers, i.e., the D-layer and the E-layer. The synchronization may include hybrid network synchronization control.

The signaling layer defines the formats of messages that manage the transfer and consumption of an MMT package. The message for consumption management is used to indicate the structure of an MMT package, and the message for transfer management is used to indicate the structure of a payload format and the configuration of a protocol.

The S.1 layer may define the formats of control messages between applications for media presentation session management. The presentation session management may define the formats of control messages exchanged between applications to provide information required for media presentation, session management, and media consumption. The S.1 layer may perform functions, such as service discovery, media session initialization/termination, media session presentation/control, and interfacing with the D-layer and the E-layer.

The S.2 layer 210 may perform delivery session management. The delivery session management may define the formats of control messages exchanged between end-points of the D-layer. The control messages defined in the delivery session management may be used for flow control, delivery session management, delivery session monitoring, error control, and hybrid network synchronization control. The S.2 layer 210 may provide signaling required between a sender and a receiver in order to support the operations of the D-layer. The signaling required between a sender and a receiver to support the operations of the D-layer may include, for example, delivery session establishment and release, delivery session management (monitoring, flow control, error control, etc), resource reservation for established delivery session, signaling for hybrid network synchronization, and signaling for adaptive delivery. Also, the S.2 layer 210 may be in charge of interfacing with the D-layer and the E-layer.

A control message (or control information) may be generated in the S layer and transmitted over a broadcast network and/or a broadband network.

In a case where transmission over both the broadcast network and the broadband network is supported, the functions of control messages transmitted over the broadcast network may be identical to the functions of control messages transmitted over the broadband network. The syntax and format of control messages may vary depending on the application and the delivery type. For example, in case of hybrid delivery, common control information and a common format may be used for control messages transmitted over the broadcast network and the broadband network. Alternatively, in case of hybrid delivery, common control information may be transmitted in different formats for the broadcast network and the broadband network. Alternatively, in case of hybrid delivery, different control information may be transmitted in different formats for the broadcast network and the broadband network.

Figure 2:
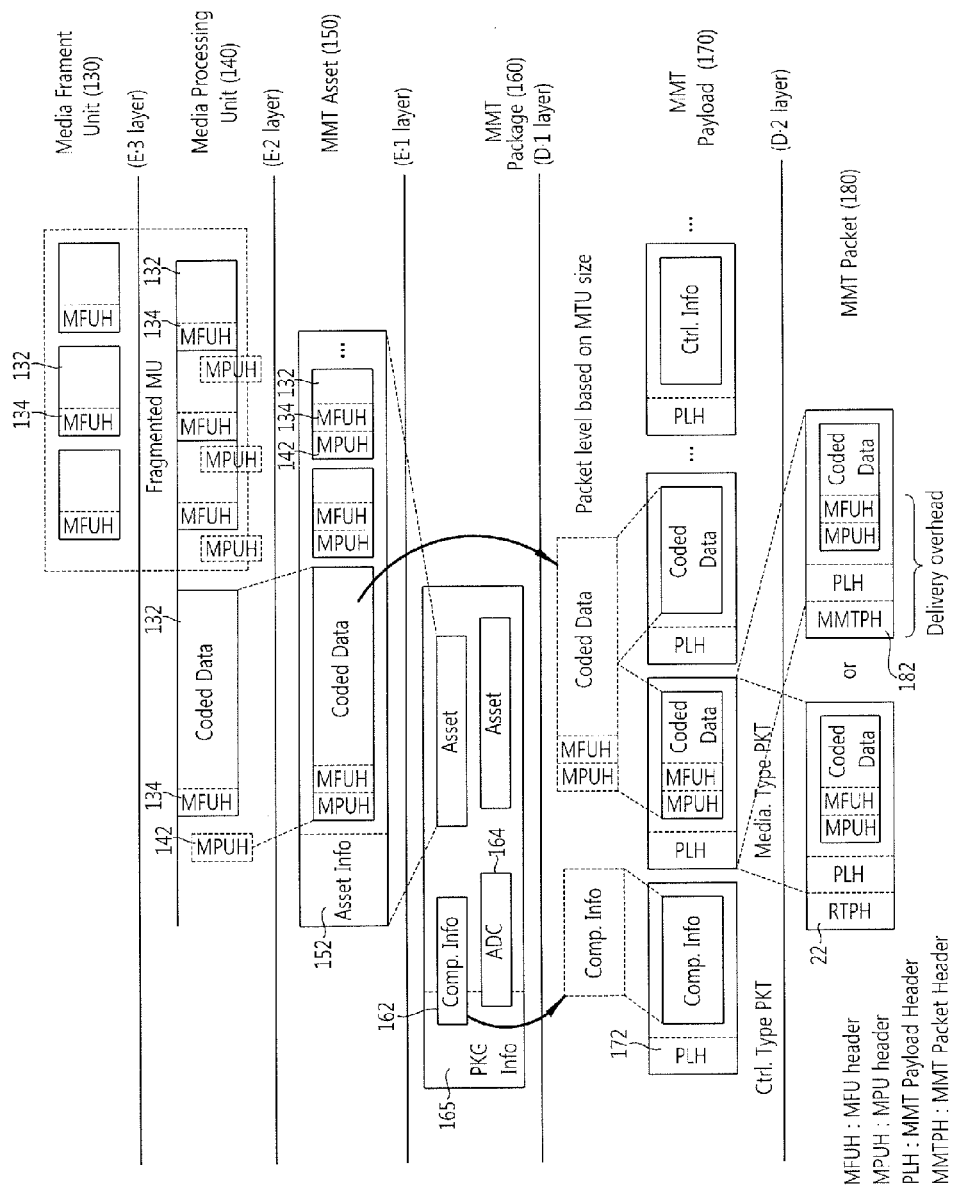
FIG. 2 sows the format of unit information (or data or packet) that is used in each layer of the MMT layer structure of FIG. 1.

FIG. 2 sows the format of unit information (or data or packet) that is used in each layer of the MMT layer structure of FIG. 1.

A Media Fragment Unit (MFU) 130 may include coded media fragment data 132 and a Media Fragment Unit Header (MFUH) 134. The MFU 130 has a general container format that is independent from a specific codec, and can load the smallest data unit that can be independently consumed in a media decoder. The MFUH 134 may include additional information, such as media characteristics, for example, loss tolerance. The MFU 130 may become, for example, a picture or slice of video.

The Media Fragment Unit (MFU) may define a format that encapsulates the part of an AU in the transport layer in order to perform adaptive transmission in a range of the MFU. The MFU may be used to transmit a specific format of coded media so that the part of the AU can be decoded or discarded independently.

The MFU has an identifier for distinguishing it from other MFUs and may have information on a general relationship between MFUs within a single AU. A dependent relationship between the MFUs in a single AU may be described, and priority related to the MFU may be described as part of this information. The information may be used to handle transmission in the underlying transport layer. For example, the transport layer may omit the transmission of MFUs that may be discarded so that QoS transmission in an insufficient bandwidth is supported.

An MPU is a set of MFUs including a plurality of the MFUs 130. The MPU may have a general container format that is independent from a specific codec, and may include media data equivalent to an access unit. The MPU may have a timed data unit or a non-timed data unit. The MPU may include a Media Processing Unit Header (MPUH) having additional information such as a timestamp for synchronization with media fragment unit data. The MPU is data that has been processed independently and fully by an entity that complies with MMT. The MPU may include at least one MFU or may include part of data that has a format defined by another standard.

The MPU is a sequence number and an associated asset ID that distinguishes it from other MPUs and can be uniquely identified within an MMT package. A single MPU can accommodate an integral number or non-timed data of one or more Aus. For timed data, an AU may be transferred from at least one MFU, but one AU cannot be fragmented into a plurality of MPUs. In non-timed data, one MPU accommodates part of non-timed data that has been processed independently and fully by an entity that complies with MMT.

The MPU may have at least one random access point. The first byte of an MPU payload may always be started from a random access point. In timed data, the above fact means that the decoding sequence of the MFU is always 0 in the MPU payload. In timed data, the presentation duration and decoding sequence of each AU may be transmitted in order to indicate the presentation time. The MPU does not have its own initial presentation time, and the presentation time of the first AU of one MPU may be described in composition information. The composition information may state the first presentation time of the MPU.

The MPU may include an MMT hint track. For packetized delivery of the MPU, the MMT hint track may provide information for converting an encapsulated MPU into an MMT payload and an MMT packet.

The MMT hint track gives a transmitter a hint as to the fragmentation of the MPU. By this, at least one MFU may be used to generate an MMT payload. Media data may be generated and delivered as an MMT payload at a transmission timing by the transmitter. Accordingly, a format to be stored may be different from a format used for delivery. In this case, there is a need for a dynamic transmitter that can extract media data and generate an MMT payload at the time of transmission.

The MMT hint track gives a hint as to the extraction and generation of an MFU for encapsulation that uses an MMT payload format. The MMT payload may include metadata or at least one MFU. The MMT hint track gives the transmitter a hint as to a method of extracting MFU data. The hint track may be omitted if fragmentation is not used.

The MMT hint track may indicate the entry format of a sample. Each media sample is specified in at least one MFU, and the sample of the MMT hint track generates at least one MFU.

The MMT hint track includes a plurality of parameters. For example, the MMT hint track may include multilayer_flag, which indicates the provision of multilayer information if it has a value of 1. Dependency_id is an ID that indicates the dependency of the corresponding MFU. Unless it has a value of 0, video is improved by at least one scalability level in terms of at least one of temporal, quality, and spatial resolutions. depth_id indicates whether the corresponding MFU delivers depth data of video. quality_id is a quality ID of the MFU. Unless it has a value of 0, video is improved by at least one scalability level in terms of at least one of temporal, quality, and spatial resolutions. temporal_id is a temporal ID of the MFU. Unless it has a value of 0, video is improved by at least one scalability level in terms of at least one of temporal, quality, and spatial resolutions. view_id is a view ID of the MFU. Unless it has a value of 0, video is improved by at least one scalability level in terms of at least one of temporal, quality, and spatial resolutions. Also, the hint track may have a layer_id parameter which indicates the ID of a scalable layer on which scalability dimensions information is provided as initial information.

The MMT asset 150 includes a plurality of MPUs. That is, the MMT asset 150 is a set of MPUs. The MMT asset 150 is a data entity including a plurality of MPUs (timed or non-timed) data) from a single data source. The MMT asset 150 may include asset packaging metadata and additional information, such as a data type. The MMT asset 150 may include, for example, video, audio, program information, an MPEG-U widget, a JPEG image, an MPEG 4 File Format (FF), Packetized Elementary Streams (PESs), and an MPEG transport stream (M2TS).

The MMT asset 150 is a logical data entity that accommodates coded media data. The MMT asset 150 may include an MMT asset header and coded media data. The coded media data may become a collective reference group of MPUs having the same MMT asset ID. Data types that can be individually consumed by an entity directly connected to an MMT client may be considered as individual MMT assets. Examples of these data types may include, for example, an MPEG-2 TS, a PES, an MP4 file, an MPEG-U widget package, and a JPEG file.

The coded media of the MMT asset 150 may be timed data or non-timed data. The timed data is sight and hearing media data that requires the synchronized decoding and presentation of specific data at a designated time. The non-timed data is data of a data type that can be decoded and provided at a specific time depending on the supply of service or a user interaction.

A service provider can generate multimedia service by integrating MMT assets in the state in which the MMT assets are placed on the space-time axis.

An MMT package 160 is a set of MMT assets including one or more of the MMT assets 150. The MMT assets within the MMT package 160 may be multiplexed or concatenated like a chain.

The MMT package is a container format for an MMT asset and configuration information. The MMT package provides the depository of the MMT asset and the configuration information for MMT program.

An MMT program provider encapsulates coded data into MMT assets and describes the MMT assets and the temporal and spatial layout of the transport characteristics of the MMT assets. An MMT asset may be directly transmitted according to the D.1 payload format. The configuration information may be transmitted through a S.1 presentation session management message. However, an MMT program provider and a client who permit the relay or further reuse of an MMT program store the configuration information in an MMT package format.

In parsing an MMT package, an MMT program provider determines through which path (e.g., broadcast or broadband) an MMT asset will be provided to a client. Configuration information in an MMT package is transmitted through the S.1 presentation session management message, along with information related to transmission.

A client receives the S.1 presentation session management message, and knows which MMT program is possible and how the MMT asset for the MMT program is received, based on the received S.1 presentation session management message.

An MMT package may also be transmitted according to the D.1 payload format. The MMT package is packetized and transmitted in the D.1 payload format. A client receives a packetized MMT package, configures all or part of the packetized MMT package, and consumes an MMT program in the configured MMT package.

Package information 165 on the MMT package 160 may include configuration information. The configuration information may include a list of MMT assets, package identification information, composition information (CI) 162, and additional information, such as Asset Delivery characteristics (ADC) 164. The composition information 162 includes information on a relationship between the MMT assets 150.

The composition information 162 may further include information on a relationship between a plurality of MMT packages if a piece of content includes the plurality of MMT packages. The composition information 162 may include information on a temporal, spatial, and adaptive relationship within the MMT packages. The composition information 162 provides information for package delivery optimization and presentation in a multiscreen environment. Also, the composition information 162 may indicate information for mapping an asset to a specific screen in a multiscreen environment. Like information that helps the transmission and presentation of an MMT package, the composition information 162 in MMT provides information on a spatial and temporal relationship between MMT assets within the MMT package.

An MMT-CI is a descriptive language that extends HTML5 and provides information on the extension. If the HTML5 has been designed to describe the page-based presentation of text-based content, the MMT-CI primarily presents a spatial relationship between sources. In order to support presentation that indicates a temporal relationship between MMT assets, the MMT-CI may be extended so that it includes information related to MMT assets within an MMT package like presentation resources, time information that determines the transmission and consumption sequence of the MMT assets, and additional attributes of media elements that consume a variety of MMT assets in HTML5.

The Asset Delivery characteristics information 164 includes information on transport characteristics and can provide information necessary to determine a delivery condition on each MMT asset (or an MMT packet). The Asset Delivery characteristics may include a traffic description parameter and a QoS descriptor.

The traffic description parameter may include information on the bit rate of the MFU 130 or the MPU and information on priority. The information on the bit rate may include, for example, information on whether an MMT asset has a Variable Bit Rate (VBR) or a Constant Bit Rate (CBR), a bit rate guaranteed for an MFU (or MPU), and a maximum bit rate for an MFU (or MPU). The traffic description parameter may be used for resource reservation between a server, a client, and other elements on a delivery path. The traffic description parameter may include, for example, information on a maximum size of an MFU (or MPU) within an MMT asset. The traffic description parameter may be updated periodically or aperiodically.

The QoS descriptor includes information for QoS control and may include, for example, delay information and loss information. The loss information may include, for example, a loss indicator about whether the delivery loss of an MMT asset has been permitted or not. For example, when the loss indicator is '1', it may indicate 'lossless'. If the loss indicator is '0', it may indicate lossy'. The delay information may include a delay indicator that is used to distinguish sensitivities in the delivery delay of MMT assets. The delay indicator may indicate whether the type of MMT asset is conversation, interactive, real time, or non-real-time or not.

A piece of content may include one MMT package or a plurality of MMT packages. If a piece of content includes a plurality of MMT packages, composition information or configuration information indicative of a temporal, spatial, and adaptive relationship between the plurality of MMT packages may be placed within one of the MMT packages or may be placed outside the MMT packages.

For example, in the case of hybrid delivery, some of content components may be transmitted over a broadcast network, and the remaining content components may be transmitted over a broadband network or another broadcast network. For example, in the case of a plurality of AV streams forming one multi-view service, one stream may be transmitted over a broadcast network, and the remaining streams may be transmitted over a broadband network. The AV streams may be multiplexed, received individually by a client terminal, and stored therein. Alternatively, there is a scenario in which application software, such as a widget, is transmitted over a broadband network and AV streams (AV program) are transmitted over a broadcast network. In another example, one media component may be transmitted over a broadband network, and the remaining media components may be transmitted over another broadband network.

In the case of the multi-view service scenario and/or the widget scenario, all AV streams may become one MMT package. In this case, one of all the AV streams may be stored in only one client terminal, storage content becomes part of an MMT package, the client terminal has to re-write composition information or configuration information again, and the re-written content becomes a new MMT package not related to a server.

In the case of the multi-view service scenario and/or the widget scenario, each of AV streams may become one MMT package. In this case, a plurality of MMT packages forms a piece of content, the MMT packages are written on storage for each MMT package, and there is a need for composition information or configuration information indicative of a relationship between MMT packages.

Composition information or configuration information included in one MMT package may refer to an MMT asset within another MMT package and may present the outside of an MMT package that refers to an MMT package in an out-band situation.

Meanwhile, in order to inform a client terminal of a list of the MMT assets 150 provided by a service provider and a possible path for the delivery of the MMT package 160, the MMT package 160 is translated into service discovery information through a signaling (S) layer, and an MMT control message may include an information table for service discovery.

A server segments multi-media content into a plurality of segment, allocates pieces of URL information to the plurality of segments segmented into a specific number, stores the pieces of URL information on the respective segments in a media information file, and sends the media information file to a client.

The media information file may be called a variety of names, such as 'Media Presentation Description (MPD)' or a 'manifest file' depending on a standardization organization for standardizing HTTP streaming.

Based on hybrid delivery, multi-layered media data may be transmitted through multiple paths. The basic concept of hybrid delivery is to combine media components on different channels. Hybrid delivery-based MMT service enables the delivery of multiple media data to a client device from different servers via multiple paths (e.g., other channels or networks). In this case, the client device has to be able to service a plurality of received media streams while keeping them in synchronization in an integrated fashion. However, according to the CMMT SoCD (Study of Committee Draft) which is currently in progress, every layer of multilayer media data must be included in a single MPU (Media Processing Unit). As an MMT asset is a collection of one or more MPUs, every layer belongs to a single MMT asset. In this case, every layer has a single ADC (Asset Delivery Characteristic). Accordingly, there is a demand for a method of assigning different delivery characteristics to individual layers of the multilayer and transmitting the layers via multiple paths.

If a plurality of layers of multi-layered media data are permitted to be distributed to two or more different MMT assets and encapsulated, one MMT asset may include one layer or some layers.

Figure 4:
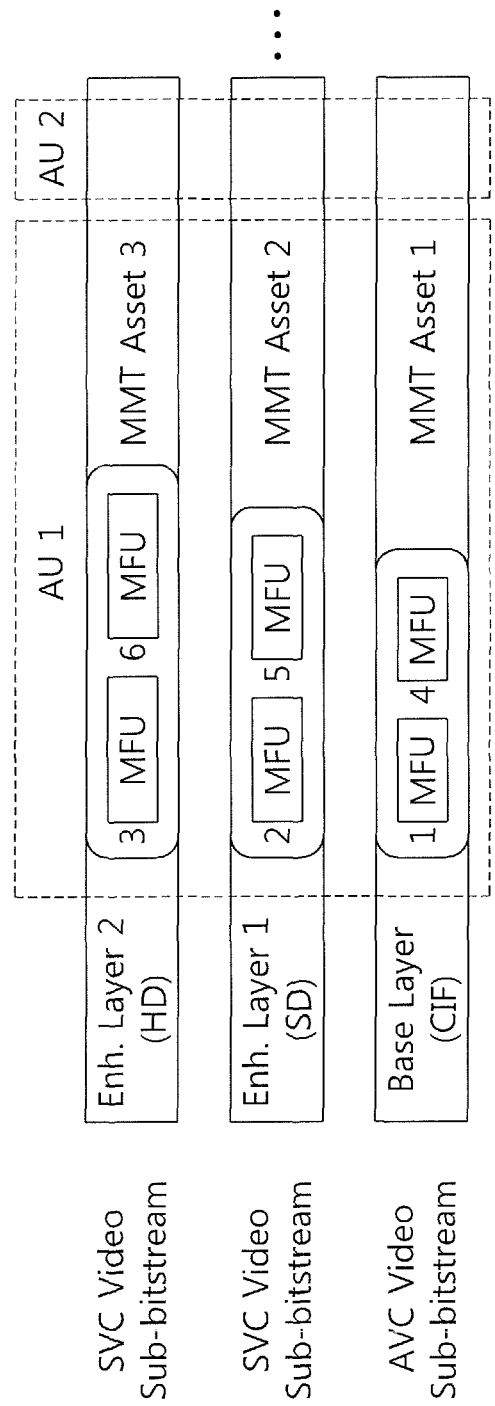
FIG. 4 shows an example of MMT assets for multi-layered media data.

FIG. 4 shows an example of MMT assets for multi-layered media data. FIG. 4 exemplifies three layers of SVC (Scalable Video Coding) media data. Three layers of SVC media data include a base layer, an enhancement layer 1, and an enhancement layer 2. Each layer is mapped into an individual MMT asset. For example, MMT asset 1 includes the base layer, MMT asset 2 includes the enhancement layer 1, and MMT asset 3 includes the enhancement layer 2. In this case, one or more different MMT assets should be referred to in order to properly decode MMT assets 2 and 3.

Figure 5:
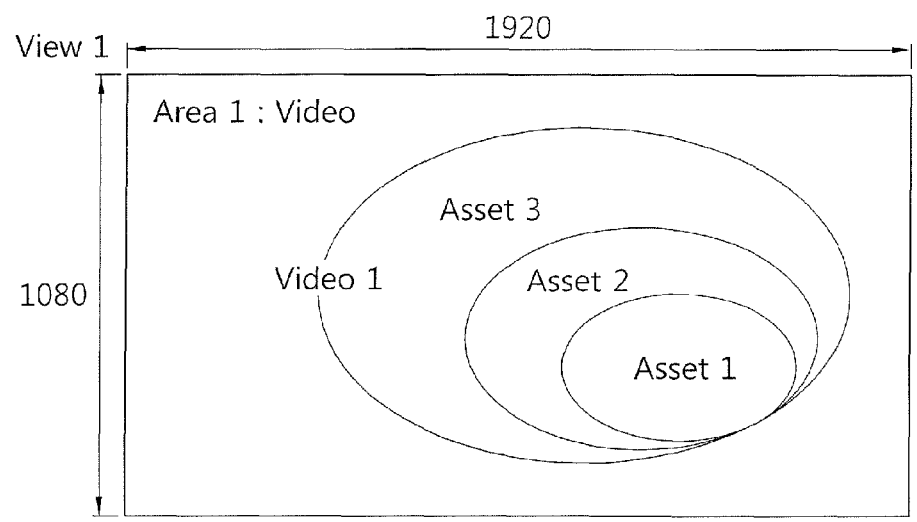
FIG. 5 is an example of a schematic view of the relationship between MMT assets for multi-layered media data.

FIG. 5 is an example of a schematic view of the relationship between MMT assets for multi-layered media data. Referring to FIG. 5, video 1 includes MMT asset 1, MMT asset 2, and MMT asset 3. In this case, MMT asset 3 may depend on MMT asset 1 and MMT asset 2, and MMT asset 2 may depend on MMT asset 1.

According to the present invention, the dependency relationship between MMT assets may be represented through MMT CI. That is, according to the present invention, MMT CI includes dependency information indicative of the dependency between MMT assets, and the dependency information may include at least one of the following attributes. MMT CI may be represented as an XML (eXtensible markup language) document. The XML document may also be referred to as a CI document. MMT CI may be described together with HTML (Hypertext Markup Language) 5 (or HTML n), or may be specified by HTML 5. HTML 5 is typically parsed into a DOM (Document Object Model) tree.

First Exemplary Embodiment

According to a first exemplary embodiment, MMT CI includes the isDependent attribute and the depID attribute. It is noted that the names of these attributes are merely exemplary and, of course, the attributes may be called by different names by agreement. For example, the depID may be called depAssetID.

The isDependent attribute indicates whether the media element depends on another media element or not. That is, the isDependent attribute indicates whether the corresponding MMT asset depends on other MMT assets. This is for guaranteeing successful decoding and presentation of the current MMT asset. If the isDependent attribute is "TRUE", this means that other MMT assets indicated by the depID attribute should be referred to for the corresponding MMT asset. If the isDependent attribute is "FALSE", this means that other MMT assets are not referred to for the corresponding MMT asset. IsDependent may be initially set to "FALSE". For example, the isDependent attribute may be represented as Boolean type.

The depID attribute is a list of IDs of media components that should be referred to for the corresponding media component. That is, the depID attribute is a list of IDs of MMT assets that should be referred to for the corresponding MMT asset. There may be one or two or more IDs of MMT assets that should be referred to. That is, the depID attribute exists only if the isDependent attribute is set to "TRUE". Also, the depID attribute may be represented as string vector type, for example.

Next, FIGS. 6 to 9 show examples of MMT CI for multi-layered media data according to a first exemplary embodiment of the present invention.

Referring to FIG. 6, MMT asset 3 depends on other MMT assets as IsDependent for MMT asset 3 is "TRUE", and MMT asset 2 and MMT asset 1 are referred to for MMT asset 3 as depID for MMT asset 3 indicates asset2 and asset1. isDependent for MMT asset 2 is "TRUE", and MMT asset is referred to for MMT asset 2. As isDependent for MMT asset 1 is "FALSE", MMT asset 1 does not depend on other MMT assets. That is, other MMT assets are not referred to for MMT asset 1.

Referring to FIG. 7, as isDependent for MMT asset 3 is "TRUE", MMT asset 3 depends on other MMT assets and MMT asset 2 is referred for MMT asset 3. isDEpendent for MMT asset 2 is "TRUE", and MMT asset 1 is referred to for MMT asset 2. As isDependent for MMT asset 1 is "FALSE", MMT asset 1 does not depend on other MMT assets.

In FIGS. 8 and 9, MMT CI is indicated by HTML 5. For example, MMT-CI may be indicated by MMT-CI begin syntax of HTML 5. In MMT CI, the refID attribute is an identifier of a media element. That is, refID may indicate an ID for identifying the corresponding MMT asset.

Referring to FIG. 8, in MMT CI, MMT asset 3 depends on other MMT assets as isDependent for MMT asset 3 whose refID indicates asset3 is "TRUE", and MMT asset 2 and MMT asset 1 are referred to for MMT asset 3 as depID for MMT asset 3 indicates asset2 and asset1. Also, MMT asset 2 depends on other MMT assets as isDependent for MMT asset 2 whose refID indicates asset2 is "TRUE", and MMT asset 1 is referred to for MMT asset 2 as depID for MMT asset 2 indicates asset1.

Referring to FIG. 9, in MMT CI, MMT asset 3 depends on other MMT assets as isDependent for MMT asset 3 whose refID indicates asset3 is "TRUE", and MMT asset 2 is referred to for MMT asset 3 as depID for MMT asset 3 indicates asset2. Also, MMT asset 2 depends on other MMT assets as isDependent for MMT asset 2 whose refID indicates asset2 is "TRUE", and MMT asset 1 is referred to for MMT asset 2 as depID for MMT asset 2 indicates asset1.

Second Exemplary Embodiment

According to a second exemplary embodiment, MMT CI includes the depID attribute. It is noted that the name of this attribute is merely exemplary and, of course, the attribute may be called by a different name by agreement.

The depID attribute is a list of IDs of MMT assets that should be referred to for the corresponding MMT asset. This is for guaranteeing successful decoding and presentation of the current MMT asset. There may be one or two or more IDs of MMT assets that should be referred to.

In one example, if there exists no other MMT asset that should be referred to for the corresponding MMT asset, the corresponding MMT asset may not have the depID attribute.

In another example, if there exists no other MMT that should be referred to for the corresponding MMT asset, the depID attribute may indicate the ID of the corresponding MMT asset.

FIGS. 10 and 12 show examples of MMT CI for multi-layered media data according to a second exemplary embodiment of the present invention.

Referring to FIG. 10, MMT asset 1 depends on other MMT assets as depID for MMT asset 2 exists, and MMT asset 1 is referred to for MMT asset 2 as depID for MMT asset 2 indicates asset 1. As depID for MMT asset 1 does not exist, MMT asset 1 does not depend on other MMT assets. That is, other MMT assets are not referred to for MMT asset 1.

Referring to FIG. 11, as depID for MMT asset 2 indicates asset1, MMT asset 2 depends on MMT asset 1 and MMT asset 1 is referred for MMT asset 2. As depID for MMT asset 1 indicates asset1, MMT asset 1 does not depend on other MMT assets. That is, other MMT assets are not referred to for MMT asset 1.

According to the present invention, the isDependent attribute and the depID attribute, which indicate the dependency (dependency relationship) between MMT assets included in MMT CI, may be included in the MediaSync element, for example, which is a child element of the CI element included in MMT CI. In this case, the isDependent attribute and the depID attribute may be represented as shown in FIG. 12.

Referring to FIG. 12, the isDependent attribute may be represented as Boolean type, and the isDependent attribute may be used optionally and the default value of the isDependent attribute may be set to "FALSE". Also, the depID attribute may be represented as string vector type and used optionally.

Figure 13:
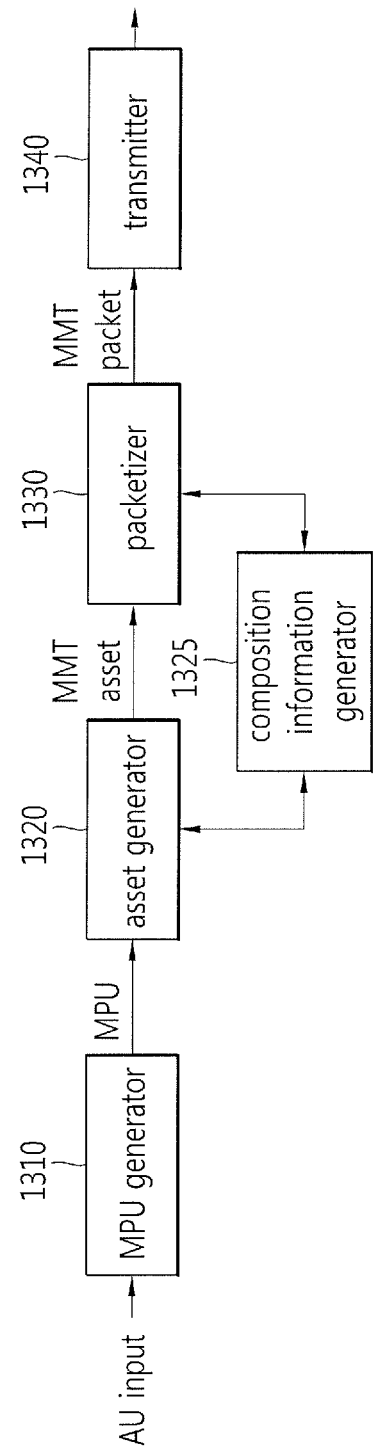
FIG. 13 is an example of a block diagram schematically showing the configuration of an MMT packet transmitting apparatus according to an exemplary embodiment of the present invention.

FIG. 13 is an example of a block diagram schematically showing the configuration of an MMT packet transmitting apparatus according to an exemplary embodiment of the present invention. As shown I FIG. 13, the MMT packet transmitting apparatus according to the present invention may include an MPU generator 1310, an asset generator 1320, a composition information generator 1325, a packetizer 1330, and a transmitter 1340.

Referring to FIG. 13, the MPU generator 130 generates a Media Processing Unit (MPU) based on a media Access Unit (AU). The procedure of generating a media processing unit in the MPU generator 1310 may be performed in the E-layer by encapsulation.

The asset generator 1320 generates an MMT asset by performing encapsulation based on the MPU generated in the MPU generator 1310. The MMT asset may include one layer or some layers of the multi-layered media data.

The composition information generator generates MMT Composition Information (MMT-CI) containing dependency information of the generated MMT asset on other MMT assets. The MMT-CI may include at least one attribute indicative of the dependency of the generated MMT asset on other related MMT assets. The MMT-CI may include at least one of the above-described isDependent and depID attributes. In this case, the MMT-CI may include, for example, the syntax shown in FIGS. 6 to 12.

The packetizer 1330 generates an MMT packet by packetizing the MMT asset generated by the asset generator 1320 and the MMT-CI. Specifically, the packetizer 1330 may generate an MMT package based on the MMT asset, the MMT-CI, and MMT asset delivery characteristics (MMT-ADC), and generate an MMT packet based on the generated MMT package.

The transmitter 1340 transmits the generated MMT packet to the receiving side.

Figure 14:
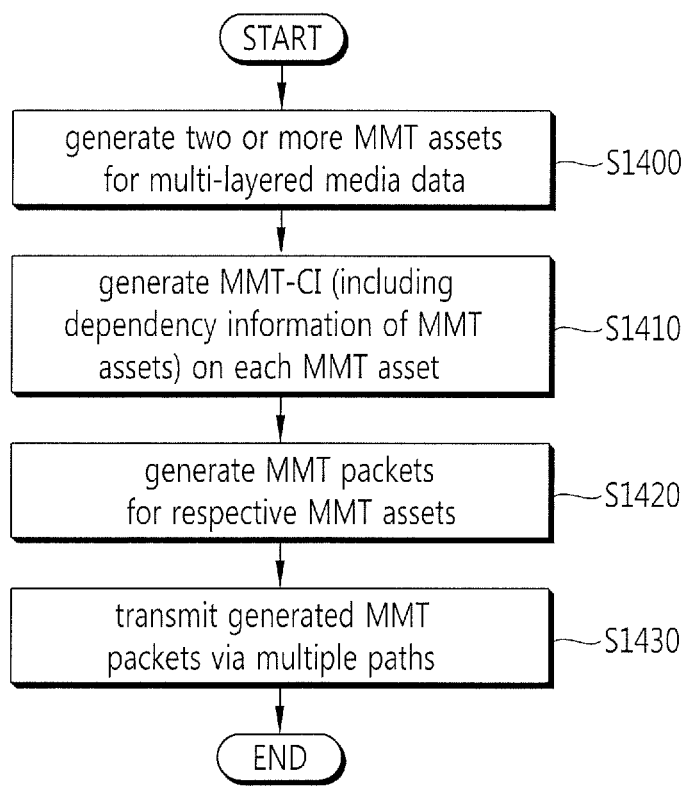
FIG. 14 is an example of a sequential chart schematically showing an MMT transmitting method according to the present invention.

FIG. 14 is an example of a sequential chart schematically showing an MMT transmitting method according to the present invention.

Referring to FIG. 14, the MMT packet transmitting apparatus according to the present invention generates two or more MMT assets for multi-layered media data (S1400). In this case, each of the two or more MMT assets may include one layer or some layers.

The MMT packet transmitting apparatus generates pieces of MMT composition information (MMT-CI) on each of the two or more MMT assets (S1410). Here, each MMT-CI may contain dependency information indicative of the dependency between the MMT assets. For example, if one of the two or more MMT assets is MMT asset 1 and the other one is MMT asset 2, the MMT-CI on MMT asset 1 may be called MMT-CI 1 and the MMT-CI on MMT asset 2 may be called MMT-CI 2. In this case, the pieces of MMT-CI may include at least one of the above-described isDependent and depID attributes. In this case, the pieces of MMT-CI may include, for example, the syntax shown in FIGS. 6 to 12.

The MMT packet transmitting apparatus generates MMT packets based on the two or more MMT assets and the pieces of MMT-CI (S1420). Each of the MMT packets may include any one of the two or more MMT assets and the MMT-CI on this MMT packet. For example, among those MMT packets, MMT packet 1 may include MMT asset 1 and MMT-CI 1, and MMT packet 2 may include MMT asset 2 and MMT-CI 2.

The MMT packet transmitting apparatus transmits the MMT packets to a receiving apparatus via multiple paths (S1430). In this case, the MMT packets may be transmitted to the receiving apparatus via different paths.

Figure 15:
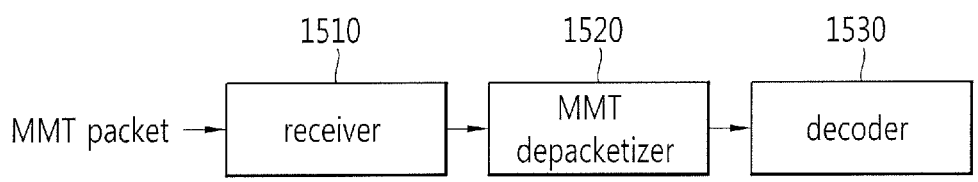
FIG. 15 is an example of a block diagram schematically showing the configuration of an MMT packet receiving apparatus according to the present invention.

FIG. 15 is an example of a block diagram schematically showing the configuration of an MMT packet receiving apparatus according to the present invention. As shown in FIG. 15, the MMT packet receiving apparatus according to an exemplary embodiment of the present invention may include a receiver 1510, an MMT depacketizer 1120, and a decoder 1130.

Referring to FIG. 15, the receiver 1510 receives an MMT packet. The receiver 1510 may receive an MMT packet transmitted on a different network or channel.

The MMT depacketizer 1520 acquires an MMT asset and MMT-CI on this MMT asset by depacketizing the MMT packet received from the receiver 1510. In this case, the MMT-CI includes information indicative of the dependency relationship of the MMT asset on other MMT assets. The MMT-CI may include at least one attribute indicative of the dependency of the generated MMT asset on other related MMT assets. The MMT-CI may include, for example, at least one of the above-described isDependent and depID attributes. In this case, the MMT-CI may include, for example, the syntax shown in FIGS. 6 to 12.

The decoder 1530 determines whether the MMT asset depends on other MMT assets or not, based on the MMT-CI, and decodes the MMT asset based on the result of determination. The decoder may analyze at least one of the isDependent and depID attributes, and determine whether the MMT asset depends on other MMT assets or not. In an example, the decoder 1530 may further analyze the depID attribute only if the isDependent attribute is "TRUE", and determine which MMT asset the MMT asset depends on. Alternatively, if the depID attribute exists, the decoder 1530 may determine that the MMT asset depends on other MMT assets, and determine which MMT asset the MMT asset depends on.

For example, if the MMT asset depends on other MMT assets, the decoder 1530 may refer to other MMT assets when decoding the MMT asset.

The depID attribute is further analyzed only if the isDependent attribute is "TRUE".

Figure 16:
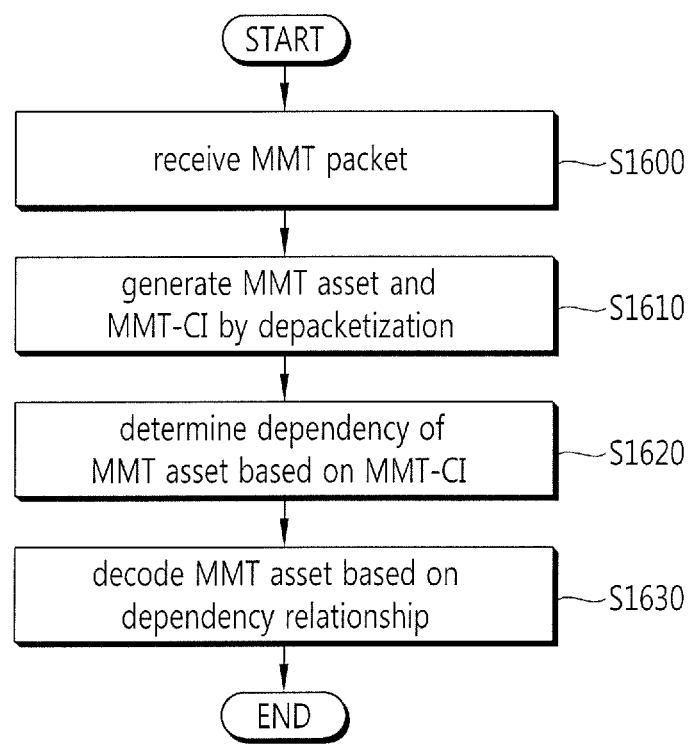
FIG. 16 is an example of a sequential chart schematically showing an MMT packet receiving method according to the present invention.

FIG. 16 is an example of a sequential chart schematically showing an MMT packet receiving method according to the present invention.

Referring to FIG. 16, the MMT packet receiving apparatus receives an MMT packet (S1600). Then, the MMT packet receiving apparatus generates an MMT asset and MMT-CI by depacketizing the received MMT packet (S1610). Next, the MMT packet receiving apparatus determines whether the MMT asset depends on other MMT assets, based on the generated MMT-CI (S1620). The MMT asset is decoded based on the dependency relationship of the MMT asset (S1630). For example, if the MMT asset depends on other MMT assets, the MMT packet receiving apparatus refers to other MMT assets when decoding the MMT asset.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. An apparatus for transmitting an MMT packet in an MMT (MPEG Media Transport) system, the apparatus comprising:

an asset generator that generates an MMT asset by performing encapsulation based on a Media Processing Unit (MPU) generated based on a media Access Unit (AU);

a composition information generator that generates MMT Composition Information (MMT-CI) on the MMT asset;

a packetizer that generates an MMT packet by packetizing the MMT asset and the MMT-CI; and a transmitter that transmits the generated MMT packet to a receiving side, wherein the MMT-CI contains dependency information of a media element on at least one other media element, wherein the MMT-CI includes isDependent and depID attributes, and the isDependent attribute indicates whether a media element depends on another media element, and the depID attribute is a list of identifications of media element on which a current media element depends on, and wherein each of the MMT asset and the at least one other MMT asset is mapped to one of SVC (Scalable Video Coding) layers including a first layer and a second layer and wherein a first asset of the first layer refer to, a second asset of the second to be decoded.

2. The apparatus of claim 1, wherein, when the composition information generator generates an MMT-CI including the isDependent attribute, the MMT-CI further includes the depID attribute only if the isDependent attribute is "TRUE".

3. The apparatus of claim 1, wherein, if the MMT asset does not depend on any other MMT asset, the composition information generator generates the MMT-CI in such a way that the depID attribute indicates the ID of the MMT asset.

4. The apparatus of claim 1, wherein the isDependent attribute is Boolean type.

5. The apparatus of claim 1, wherein the depID attribute is string vector type.

6. An apparatus for receiving an MMT packet in an MMT (MPEG Media Transport) system, the apparatus comprising:

a receiver that receives an MMT packet from an MMT packet transmitting apparatus;

an MMT depacketizer that generates an MMT packet and MMT Composition Information (MMT-CI) on an MMT asset by depacketizing the received MMT packet; and a decoder that determines the dependency relationship between a media element and at least one other media element, based on dependency information contained in the MMT-CI, and decodes the media element based on the dependency relationship, wherein the MMT-CI includes isDependent and depID attributes, and the isDependent attribute indicates whether a media element depends on another media element, and the depID attribute is a list of identifications of media element on which a current media element depends on, and wherein each of the MMT asset and the at least one other MMT asset is mapped to one of SVC (Scalable Video Coding) layers including a first layer and a second layer and wherein a first asset of the first layer refer to a second asset of the second layer to be decoded.

7. The apparatus of claim 6, wherein the decoder further analyzes a depIDattribute only if the isDependent attribute is "TRUE".

8. The apparatus of claim 6, wherein the decoder determines the MMT asset does not depend on any other MMT asset if the depIDattribute indicates the ID of the MMT asset.

9. The apparatus of claim 6, wherein the decoder determines the dependency relationship between the MMT asset and the at least one other MMT asset, based on the depIDattribute of string vector type.

10. A method for receiving an MMT packet in an MMT (MPEG Media Transport) system, the method comprising:

receiving an MMT packet from a transmitting side;

generating an MMT packet and MMT Composition Information (MMT-CI) on the MMT asset by depacketizing the received MMT packet;

determining the dependency relationship between the MMT asset and at least one other MMT asset based on dependency information contained in the MMT-CI; and decoding a media element based on the dependency relationship, wherein the MMT-CI includes isDependent and depID attributes, and the isDependent attribute indicates whether a media element depends on another media element, and the depID attribute is a list of identifications of media element on which a current media element depends on, and wherein each of the MMT asset and the at least one other MMT asset is mapped to one of SVC (Scalable Video Coding) layers including a first layer and a second layer and wherein a first asset of the first layer refer to a second asset of the second layer to be decoded.

11. The method of claim 10, wherein the depID attribute is included in the MMT-CI only if the isDependent attribute is "TRUE".

12. The method of claim 10, wherein the isDependent attribute indicates the ID of the MMT asset if the MMT asset does not depend on any other MMT asset.

* * * * *